US010069118B2

(12) United States Patent
Yamato et al.

(10) Patent No.: US 10,069,118 B2
(45) Date of Patent: Sep. 4, 2018

(54) CYLINDRICAL SECONDARY BATTERY AND METHOD FOR MANUFACTURING SAME

(71) Applicant: SANYO Electric Co., Ltd., Daito-shi, Osaka (JP)

(72) Inventors: Kenji Yamato, Osaka (JP); Shuichi Yamashita, Tokushima (JP); Yuma Yamaguchi, Tokushima (JP); Takahiro Fukuoka, Tokushima (JP)

(73) Assignee: SANYO Electric Co., Ltd., Osaka (JP)

( * ) Notice: Subject to any disclaimer, the term of this patent is extended or adjusted under 35 U.S.C. 154(b) by 448 days.

(21) Appl. No.: 14/651,392

(22) PCT Filed: Dec. 12, 2013

(86) PCT No.: PCT/JP2013/007308
§ 371 (c)(1),
(2) Date: Jun. 11, 2015

(87) PCT Pub. No.: WO2014/097586
PCT Pub. Date: Jun. 26, 2014

(65) Prior Publication Data
US 2015/0333313 A1 Nov. 19, 2015

(30) Foreign Application Priority Data

Dec. 19, 2012 (JP) ................................. 2012-277291

(51) Int. Cl.
*H01M 2/34* (2006.01)
*H01M 10/04* (2006.01)
(Continued)

(52) U.S. Cl.
CPC ....... *H01M 2/0413* (2013.01); *H01M 2/1241* (2013.01); *H01M 2/263* (2013.01);
(Continued)

(58) Field of Classification Search
CPC ............. H01M 2/345; H01M 10/0431; H01M 2200/20; H01M 2/0413; H01M 2/1241; H01M 2/263
See application file for complete search history.

(56) References Cited

U.S. PATENT DOCUMENTS 7,378,187 B2 * 5/2008 Kim .................. B29C 45/14336
29/623.2
2006/0078787 A1 4/2006 Sato et al.
(Continued)

FOREIGN PATENT DOCUMENTS

| JP | 2004-319465 A | 11/2004 |
|---|---|---|
| JP | 2007-200755 A | 8/2007 |
| JP | 2008-282679 A | 11/2008 |
| JP | 2009-266714 A | 11/2009 |
| JP | 2010-520580 A | 6/2010 |
| JP | 2010-192438 A | 9/2010 |
| JP | 2012-190779 A | 10/2012 |

OTHER PUBLICATIONS

International Search Report dated Jan. 21, 2014 issued in corresponding application No. PCT/JP2013/007308.

*Primary Examiner* — Osei K Amponsah
(74) *Attorney, Agent, or Firm* — Westerman, Hattori, Daniesl & Adrian, LLP

(57) ABSTRACT

A sealing body of a battery includes a positive electrode cap, a safety valve electrically connected to the positive electrode cap, a plurality of protrusions that are disposed annularly and intermittently on the outer peripheral side of a conductive contact part of the safety valve and that are each formed so as to be inclined toward the center of the sealing body, and an insulating member that covers at least top parts of the plurality of protrusions, side surfaces thereof on the center side, and a surface of the safety valve on the center side, that is fitted to the center side of the plurality of protrusions, whose vertical sectional shape is bent in a Z-shape. A terminal plate is fitted and fixed to the center side of the insulating member and is connected by welding to the
(Continued)

conductive contact portion through a central opening of the insulating member.

11 Claims, 3 Drawing Sheets

(51) Int. Cl.
  *H01M 2/04* (2006.01)
  *H01M 2/12* (2006.01)
  *H01M 2/26* (2006.01)

(52) U.S. Cl.
  CPC ....... *H01M 2/345* (2013.01); *H01M 10/0431* (2013.01); *H01M 2200/20* (2013.01); *Y10T 29/49112* (2015.01)

(56) References Cited

U.S. PATENT DOCUMENTS

| | | | |
|---|---|---|---|
| 2008/0107957 A1 | 5/2008 | Meguro et al. | |
| 2008/0131769 A1 | 6/2008 | Sato et al. | |
| 2010/0159307 A1 | 6/2010 | Mao et al. | |
| 2010/0209765 A1 | 8/2010 | Bak | |
| 2012/0315513 A1* | 12/2012 | Ro | H01M 2/0413 429/53 |

* cited by examiner

CYLINDRICAL SECONDARY BATTERY AND METHOD FOR MANUFACTURING SAME

TECHNICAL FIELD

The present invention relates to a cylindrical secondary battery having a safety valve and a method for manufacturing the same.

BACKGROUND ART

Hitherto, nickel-hydrogen storage batteries and non-aqueous electrolyte secondary batteries having a cylindrical shape are widely used. Sealing portions of these cylindrical secondary batteries have a positive electrode cap, a positive polarity thermistor (PTC), and a safety valve that are electrically connected to each other by contact. However, a PTC-less type is used in models for tool use and large current use such as electric vehicles (EV) and hybrid electric vehicle (HV, PHEV) in order to take out large power.

As one of the sealing portions of PTC-less type in such cylindrical secondary batteries, for example, as disclosed in Patent Literature 1 below, a sealing portion having a configuration in which a positive electrode cap and a safety valve are fixed by caulking and laser welding is known. In assembling this sealing portion of PTC-less type, a safety valve and a terminal plate serving as a conductive component of an electrode body are arranged with an insulating member therebetween, the safety valve and the terminal plate are fixed by glue material attached to both sides of the insulating member, and a current cut-off portion of the safety valve and the terminal plate are electrically connected by laser welding.

CITATION LIST

Patent Literature

Patent Literature 1: Japanese Published Unexamined Patent Application No. 2008-282679

SUMMARY OF INVENTION

Technical Problem

However, for the sealing portion of PTC-less type disclosed in the above Patent Literature 1, the following problems (1) and (2) are present, and improvement is required.

(1) During the production of the sealing member, positioning of the safety valve and the terminal plate is required, and the productivity is low.

(2) When an impact is applied to the terminal plate, a load is easily applied to a welding part between the safety valve and the terminal plate, and welding detachment occurs.

According to a cylindrical secondary battery and a method for manufacturing the same of an embodiment of the present invention, a safety valve, an insulating member, and a terminal plate can be integrated by being fitted to each other. Therefore, a cylindrical secondary battery whose sealing body has improved productivity and that has good impact resistance can be provided.

Solution to Problem

A cylindrical secondary battery of an embodiment of the present invention includes a sealing body fixed by caulking to an opening of a bottomed tubular cylindrical outer can with a gasket therebetween, and a wound electrode assembly in which a positive electrode plate and a negative electrode plate are wound so as to be insulated from each other with a separator therebetween and electrolyte that are disposed in the cylindrical outer can.

The sealing body includes a terminal cap protruding to the outer side of the cylindrical outer can, a terminal plate that is located closer to the wound electrode assembly than the terminal cap is and that is electrically connected to the positive electrode plate or the negative electrode plate, a safety valve that is disposed between the terminal cap and the terminal plate, a peripheral portion of which is conductively connected to the terminal cap, in which a conductive contact portion provided in a part other than the peripheral portion is conductively connected by welding to the terminal plate, and that has such a structure that, when internal pressure increases, electrical conduction with the terminal plate is cut off, an insulating member disposed between a peripheral portion of the terminal plate and the safety valve, a protrusion formed on a side of the safety valve closer to the wound electrode assembly and on the outer peripheral side of the conductive contact portion so as to be inclined toward the center, and an insulating member that covers at least the top of the protrusion, a side of the protrusion closer to the center of the safety valve, and a surface of the safety valve on the center side, that is fitted to a side of the protrusion closer to the center of the safety valve, and whose vertical sectional shape is bent in a Z-shape.

The terminal plate is fitted and fixed to a side of the insulating member closer to the center of the safety valve, and is connected by welding to the conductive contact portion through a central opening of the insulating member.

A method for manufacturing a cylindrical secondary battery of an embodiment of the present invention includes the steps of:

winding a positive electrode plate and a negative electrode plate such that they are insulated from each other with a separator therebetween to form a wound electrode assembly;

using a safety valve that has, in a part other than a peripheral part, a conductive contact portion that is broken and separated from the peripheral part when internal pressure increases and that has a protrusion formed on the outer peripheral side of the conductive contact portion so as to be inclined toward the center of the safety valve, conductively disposing a terminal cap and a side of the safety valve opposite the side on which the protrusion is formed, and fitting an insulating member whose vertical sectional shape is bent in a Z-shape to a side of the protrusion closer to the center of the safety valve, thereby covering at least the top of the protrusion, a side of the protrusion closer to the center of the safety valve, and a surface of the safety valve on the center side, fitting a terminal plate electrically connected to the positive electrode plate or the negative electrode plate to a side of the insulating member closer to the center of the safety valve, and connecting by welding the terminal plate and the conductive contact portion of the safety valve through a central opening of the insulating member to form a sealing body;

disposing the wound electrode assembly in a bottomed tubular cylindrical outer can, and injecting electrolyte into the cylindrical outer can; and disposing the sealing body in the opening of the cylindrical outer can with a gasket therebetween such that the terminal cap is on the outer side, caulking the opening of the cylindrical outer can, and thereby sealing and fixing the sealing body to the opening of the cylindrical outer can.

Advantageous Effects of Invention

According to a cylindrical secondary battery of an embodiment of the present invention, a protrusion that is formed on a safety valve and that is inclined toward the center of the safety valve is present, and a terminal plate can be securely fixed from all directions by an insulating member that is fitted to a side of the protrusion closer to the center of the safety valve and whose vertical sectional shape is bent in a Z-shape. Therefore, when an impact is applied to the terminal plate, a load is less likely to be applied to a welding part between the safety valve and the terminal plate, and welding detachment is less likely to occur.

According to a method for manufacturing a cylindrical secondary battery of an embodiment of the present invention, positioning of an insulating member and a terminal plate is facilitated, therefore the productivity is improved, and a cylindrical secondary battery having the above-described advantageous effects can be easily manufactured.

DESCRIPTION OF EMBODIMENTS

Hereinafter, the embodiment of the present invention will be described in detail with reference to the accompanying drawings. However, the embodiment shown below is intended to illustrate a cylindrical non-aqueous electrolyte secondary battery as a cylindrical secondary battery for embodying the technical idea of the present invention, and the present invention is not intended to be limited to this cylindrical non-aqueous electrolyte secondary battery. The present invention can also be equally applied to those in which various changes are made without departing from the spirit set forth in the claims, for example, a cylindrical nickel-hydrogen storage battery having a safety valve.

Figure 1A:
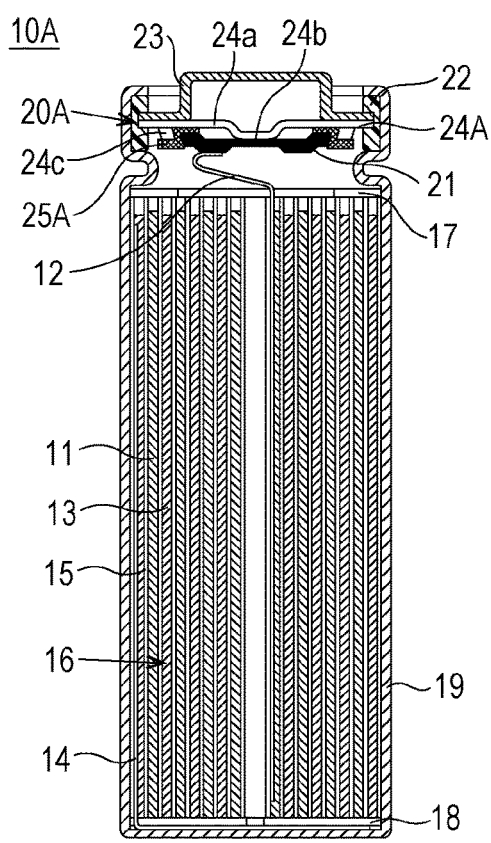
FIG. 1A is a longitudinal sectional view of a cylindrical non-aqueous electrolyte secondary battery used in Experimental Example 1.
Figure 3A:
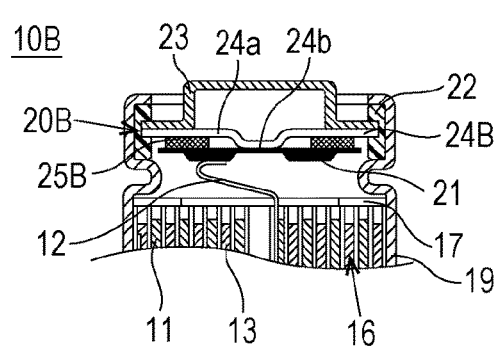
FIG. 3A is a longitudinal sectional view of a sealing body portion of a cylindrical non-aqueous electrolyte secondary battery used in Experimental Example 2.

First, the specific configuration and manufacturing method of a cylindrical non-aqueous electrolyte secondary battery common to each experimental example will be described with reference to FIG. 1A and FIG. 3A.

[Preparation of Positive Electrode Plate]

A positive electrode plate 11 was prepared as follows. First, 95 parts by mass of lithium cobalt composite oxide ($LiCoO_2$) as a positive electrode active material, 2.5 parts by mass of acetylene black as a conductive agent, and 2.5 parts by mass of polyvinylidene fluoride (PVdF) powder as a binder were mixed together in N-methyl-2-pyrrolidone (NMP) to prepare a positive electrode mixture slurry. Next, the positive electrode mixture slurry was applied to both sides of a positive electrode core body made of aluminum foil 20 µm thick by a doctor blade method, was dried, and was then rolled by compression rollers. Next, a positive electrode tab 12 made of aluminum was attached by welding to a positive electrode core body exposed portion on the winding start side to prepare a positive electrode plate 11.

[Preparation of Negative Electrode Plate]

A negative electrode plate 13 was prepared as follows. First, graphite powder as a negative electrode active material, styrene-butadiene rubber (SBR) (styrene:butadiene=1:1) as a binder, and carboxymethylcellulose (CMC) as a thickener were added into the water such that graphite:SBR:CMC=95:3:2 to prepare a negative electrode mixture slurry. The negative electrode mixture slurry was applied to both sides of a negative electrode core body made of copper foil 8 µm thick by a doctor blade method, was dried, and was then rolled by compression rollers. Next, a negative electrode tab 14 made of a copper-nickel clad material was attached by welding to a negative electrode core body exposed portion on the winding end side to prepare a negative electrode plate 13.

[Preparation of Non-Aqueous Electrolyte]

A non-aqueous electrolyte was prepared by mixing together ethylene carbonate (EC), methylethyl carbonate (MEC), and diethyl carbonate (DEC) in a volume ratio of 30:60:10 (25° C.), and then dissolving lithium hexafluorophosphate ($LiPF_6$) such that the concentration was 1 mol/L.

The thus prepared positive electrode plate 11 and negative electrode plate 13 were wound, with the positive electrode tab 12 on the winding start side, so as to be insulated from each other with a separator 15 made of a polyethylene microporous film therebetween, and a tape made of polypropylene was attached to the outermost periphery to prepare a cylindrical wound electrode assembly 16.

[Assembly of Battery]

Insulating plates 17 and 18 each having a hole in the center were disposed on the top and bottom of the thus prepared wound electrode assembly 16, and the negative electrode tab 14 was bent at an appropriate position into an L-shape so that the distal end is parallel to the bottom of a bottomed cylindrical outer can 19. The wound electrode assembly 16 having the thus bent negative electrode tab 14 was inserted into the cylindrical outer can 19. Next, the negative electrode tab 14 was fixed by resistance welding to the inner side of the bottom of the outer can 19.

Further, the positive electrode tab 12 was passed through a hole formed in the center of the upper insulating plate 17 and was bent into an S-shape, and the distal end thereof was welded to a terminal plate 21 constituting a sealing body 20A (Experimental Example 1) or 20B (Experimental Example 2). The specific configurations of the sealing bodies 20A and 20B corresponding to respective experimental examples will be described later.

After that, the above-described non-aqueous electrolyte was injected into the outer can 19, vacuum-impregnation was performed, then the circumference of the sealing body 20A or 20B was clamped with a gasket 22, and the open end of the outer can 19 was caulked and fixed to prepare the non-aqueous electrolyte secondary batteries 10A (Experimental Example 1) and 10B (Experimental Example 2) of respective experimental examples. The non-aqueous electrolyte secondary batteries 10A and 10B are each 18 mm in diameter, 65 mm in length, and 2800 mAh in design capacity.

Experimental Example 1

Figure 1B:
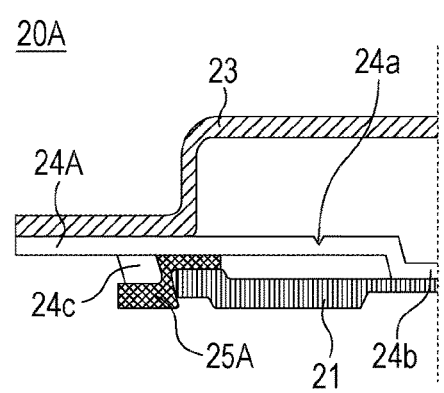
FIG. 1B is a partially enlarged longitudinal sectional view of the sealing body of FIG. 1A.
Figure 1C:
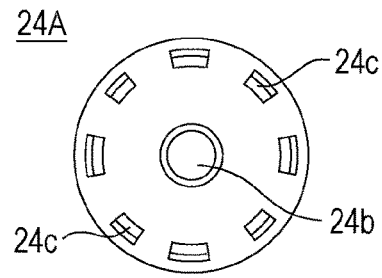
FIG. 1C is a bottom view of a safety valve.

The specific configuration of the sealing body 20A of Experimental Example 1 will be described with reference to FIG. 1 and FIG. 2. The sealing body 20A of Experimental Example 1 includes a positive electrode cap 23 serving as a positive electrode terminal, a safety valve 24A, and an insulating member 25A that is disposed between the outer peripheral side of the safety valve 24A and the outer peripheral side of the terminal plate 21 and that has an opening in the central part. A conductive contact portion 24b located in the central part of the safety valve 24A and the central part of the terminal plate 21 are laser-welded together, and electrical conduction between the safety valve 24A and the terminal plate 21 is performed in this part.

On the outer peripheral side of the safety valve 24A, a thin portion 24a including, for example, a V-shaped groove is formed annularly or intermittently annularly around the conductive contact portion 24b in the central part. The outer peripheral side of the safety valve 24A is welded to a flange portion formed on the outer peripheral side of the positive electrode cap 23 so as to be electrically connected therewith. The safety valve 24A has such a function that when the pressure in the battery increases, it deforms, the thin portion 24a breaks, the electrical conduction between the conductive contact portion 24b and the positive electrode cap 23 is thereby cut off, and the current does not flow to the outside.

The safety valve 24A in the sealing body 20A of Experimental Example 1 has, on the side facing the terminal plate 21, a plurality of, for example, eight protrusions 24c that are formed annularly and intermittently on the outer peripheral side of the conductive contact portion 24b such that they are each inclined toward the center of the safety valve 24A. The plurality of protrusions 24c are inclined by an angle A (A<90°) from the surface of the safety valve 24A, and as shown in Step 1 of FIG. 2, the corner portion 24d closer to the center of the safety valve 24A is rounded. When the corner portion 24d is rounded, an insulating member 25A, which will be described later, can be easily fitted, and the assembly is facilitated. In addition, when the angle A of the plurality of protrusions 24c is an acute angle, the insulating member 25A is less likely to come off after the insulating member 25A is fitted to the plurality of protrusions 24c, and therefore the assembly of the subsequent process is facilitated.

The assembly of the sealing body 20A is performed as follows. First, the outer peripheral side of the safety valve 24A and the flange portion formed on the outer peripheral side of the positive electrode cap 23 are welded together to integrate the safety valve 24A and the positive electrode cap 23. Then, as shown in Steps 2 and 3 of FIG. 2, an insulating member 25A that is annular and whose vertical sectional shape is bent in a Z-shape is fitted on the center side of the plurality of protrusions 24c. In the insulating member 25A, as shown in Step 2 of FIG. 2, the Z-shaped bending angle B is larger than the inclination angle A of the plurality of protrusions 24c with respect to the safety valve 24A (however, A<B<90°). Further, the diameter on the outer peripheral side in the direction in which the insulating member 25A is fitted to the plurality of protrusions 24c is larger by a clearance C than the inner diameter of the corner portion 24d of the plurality of protrusions 24c. In addition, in the insulating member 25A, the corner portion 25a of the part fitted to the plurality of protrusions 24c is rounded.

When A<B<90°, and, in the insulating member 25A, the diameter on the outer peripheral side in the direction of fitting to the plurality of protrusions 24c is larger than the inner diameter of the corner portion 24d of the plurality of protrusions 24c, the insulating member 25A is less likely to come off after the insulating member 25A is fitted to the plurality of protrusions 24c, and therefore the subsequent steps can be easily performed. When, in the insulating member 25A, the corner portion 25a of the part fitted to the plurality of protrusions 24c is rounded, the insulating member 25A can be easily fitted to the inner side of the plurality of protrusions 24c, and therefore the assembly is facilitated.

Figure 2:
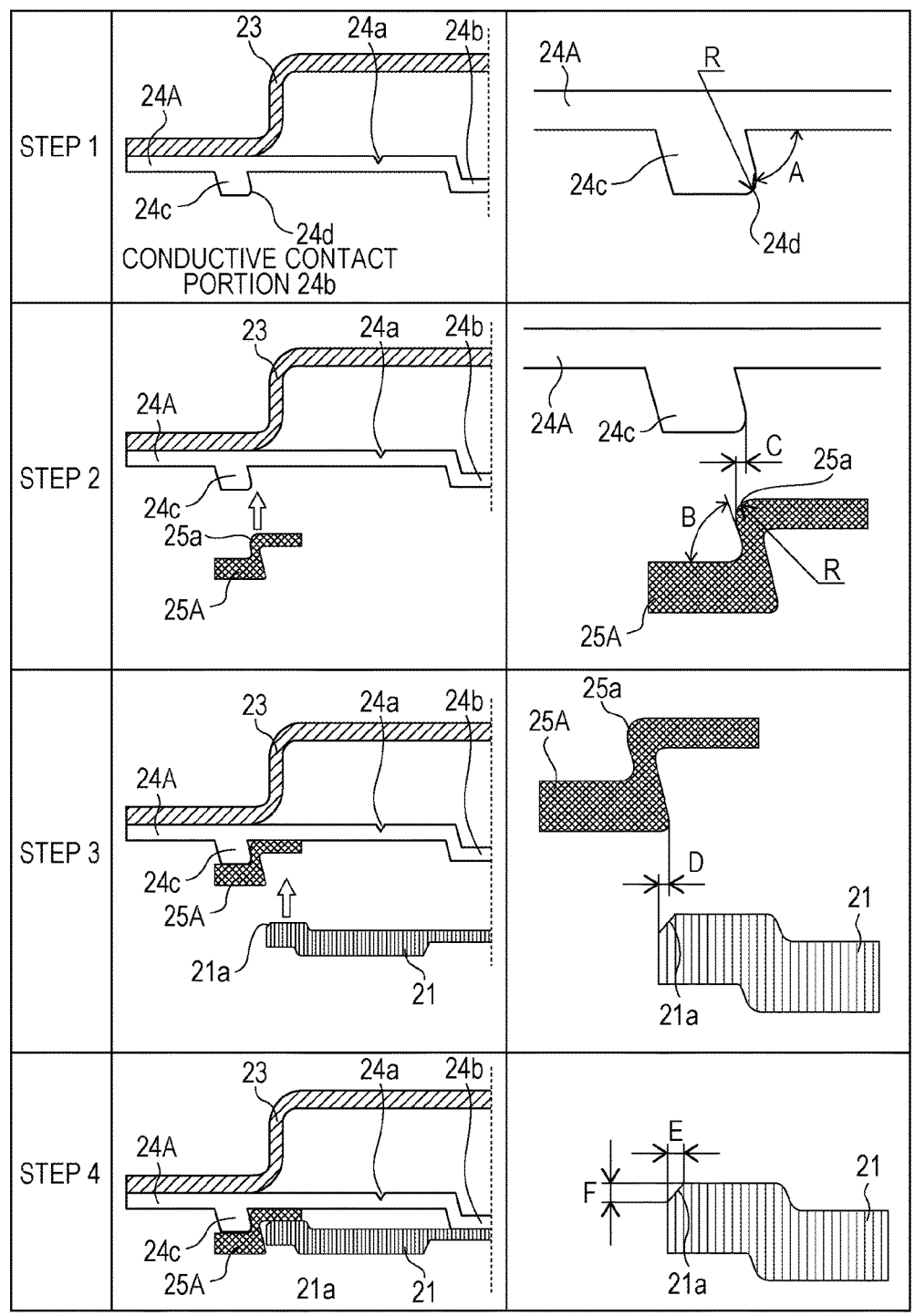
FIG. 2 includes partially enlarged longitudinal sectional views showing the assembly process of the sealing body of Experimental Example 1 and partially enlarged longitudinal sectional views showing specific configurations of respective members.

Next, as shown in the Step 3 in FIG. 2, the terminal plate 21 is fitted to the center side of the insulating member 25A that is fitted to the inner side of the plurality of protrusions 24c. In addition, the outer diameter of the terminal plate 21 in the direction of fitting to the insulating member 25A is larger by a clearance D than the inner diameter of a part of the insulating member 25A that receives the terminal plate 21. As shown in Step 4 of FIG. 2, the terminal plate 21 has a tapered portion that is formed in the corner portion 21a in the direction of fitting to the insulating member 25A and that has a length E in the outer diameter direction and a length F in the thickness direction.

When the outer diameter of the terminal plate 21 in the direction of fitting to the insulating member 25A is larger than the inner diameter of a part of the insulating member 25A that receives the terminal plate 21, the terminal plate 21 is less likely to come off after the terminal plate 21 is fitted to the insulating member 25A, and therefore the subsequent steps can be easily performed. When the terminal plate 21 has a tapered portion that is formed in the corner portion 21a in the direction of fitting to the insulating member 25A, the terminal plate 21 can be easily fitted to the inner side of the insulating member 25A.

Thus, the terminal plate 21 is firmly positioned and fixed to the inner side of the plurality of protrusions 24c in a state where it is insulated from the safety valve 24A by the insulating member 25A. Then, by laser-welding the terminal plate 21 and the conductive contact portion 24b of the safety valve 24A, electrical conduction between the terminal plate 21 and the safety valve 24A is ensured. Incidentally, the welding between the terminal plate 21 and the conductive contact portion 24b of the safety valve 24A is not limited to laser welding, and a welding method by a high energy beam such as an electron beam may be employed.

In the sealing body 20A of Experimental Example 1, A=60°, B=62°, C=0.04 mm, the radius of curvature of R=0.20 mm, D=0.03 mm, E=0.10 mm, and F=0.15 mm. However, these numerical values are not critical, and can be appropriately set experimentally as long as they meet the conditions of A<B<90°, 0<C<R, D<E, and E<F.

Experimental Example 2

Figure 3B:
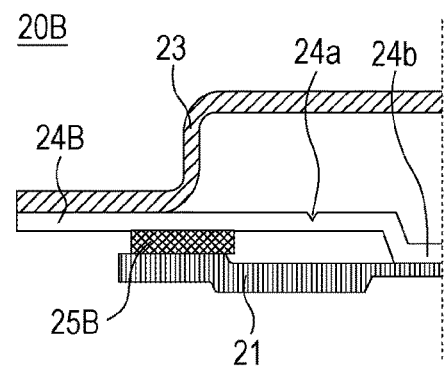
FIG. 3B is a partially enlarged longitudinal sectional view of the sealing body in FIG. 3A.

The sealing body 20B of Experimental Example 2 will be described with reference to FIG. 3. The sealing body 20B of Experimental Example 2 differs from the sealing body 20A of Experimental Example 1 in that protrusions are not formed on a side of the safety valve 24B facing the terminal plate 21 and that the insulating member 25B has an annular disk shape, and the other configurations are substantially the same as those in the case of the sealing body 20A of Experimental Example 1. So, for the sealing body 20B of Experimental Example 2, the same reference signs will be used to designate the same components as those of the sealing body 20A of Experimental Example 1, and detailed description thereof will be omitted.

The assembly of the sealing body 20B of Experimental Example 2 is performed as follows. The insulating member 25B used has an annular disk shape, and glue material is applied (not shown) to both sides thereof. First, the insulating member 25B is attached and fixed by the glue material so as to surround the conductive contact portion 24b of the safety valve 24B. Then, the terminal plate 21 is attached to the surface of the insulating member 25B attached to the surface of the safety valve 24B. Thus, the insulating member 25B is fixed in a state of being insulated from the safety valve 24B. Then, by laser-welding the terminal plate 21 and the conductive contact portion 24b of the safety valve 24B, electrical conduction between the terminal plate 21 and the safety valve 24B is ensured, and the sealing body 20B of Experimental Example 2 is completed.

[Confirmation of Productivity]

For each of the sealing body 20A of Experimental Example 1 and the sealing body 20B of Experimental Example 2, the time required for continuously manufacturing a certain number was measured. It was confirmed that the manufacturing time of the sealing body 20A of Experimental Example 1 is about ½ of the manufacturing time of the sealing body of Experimental Example 2. It is thought that this is because, in the sealing body 20A of Experimental Example 1, assembly is completed by simply fitting the insulating member 25A to the plurality of protrusions 24c formed on the safety valve 24A, and then fitting the terminal plate 21, whereas, in the sealing body 20B of Experimental Example 2, it takes a long time for the positioning of the insulating member 25B and the positioning of the terminal plate 21.

[Impact Resistance Test]

Next, for each of the cylindrical non-aqueous electrolyte secondary battery 10A of Experimental Example 1 and the cylindrical non-aqueous electrolyte secondary battery 10B of Experimental Example 2 that are prepared as described above, an impact resistance test was performed without particularly performing the charging operation. In the impact resistance test, a plurality of cylindrical non-aqueous electrolyte secondary batteries 10A and a plurality of cylindrical non-aqueous electrolyte secondary batteries 10B were dropped from a height of 1.85 m onto concrete. One set consisted of dropping once with the positive electrode cap 23 facing downward, dropping once with the bottom of the outer can 19 facing downward, and dropping once with the side of the outer can 19 facing downward. Evaluation was performed on the incidence of welding detachment of the weld part formed between the safety valve 24A or 24B and the terminal plate 21. The results are summarized and shown in Table 1.

TABLE 1

|  | Incidence of welding detachment | |
| --- | --- | --- |
|  | Experimental Example 1 | Experimental Example 2 |
| After 5 sets of dropping | 0% | 0% |
| After 10 sets of dropping | 0% | 20% |
| After 15 sets of dropping | 0% | 100% |
| After 20 sets of dropping | 30% | 100% |
| After 25 sets of dropping | 60% | 100% |
| After 30 sets of dropping | 80% | 100% |

From the results shown in Table 1, it has been confirmed that, in the case of the cylindrical non-aqueous electrolyte secondary battery 10A of Experimental Example 1, the impact resistance is better than in the case of the cylindrical non-aqueous electrolyte secondary battery 10B of Experimental Example 2. It is thought that this is because, since, in the sealing body 20A of Experimental Example 1, the insulating member 25A is fitted to a plurality of protrusions 24c formed in the safety valve 24A, and the terminal plates 21 is fitted to the plurality of protrusions with the insulating member 25A therebetween, the impact at the time of dropping is less likely to be applied to the weld part formed between the safety valve 24A and the terminal plate 21 than in the case of the cylindrical non-aqueous electrolyte secondary battery 10B of Experimental Example 2.

Although, in the above-described Experimental Example 1, an example is shown in which the safety valve 24A has a plurality of protrusions 24c formed annularly and intermittently, the safety valve 24A may have an annular protrusion or a not annular protrusion. Also, although an example is shown in which the insulating member 25A is annular, the insulating member may not be annular because the insulating member only has to be fitted so as to match the shape of the protrusion.

The invention claimed is:

1. A cylindrical secondary battery comprising:
   a sealing body fixed by caulking to an opening of a bottomed tubular cylindrical outer can with a gasket therebetween; and
   a wound electrode assembly in which a positive electrode plate and a negative electrode plate are wound so as to be insulated from each other with a separator therebetween and an electrolyte that are disposed in the cylindrical outer can,
   the sealing body including
      a terminal cap protruding to the outer side of the cylindrical outer can,
      a terminal plate that is located closer to the wound electrode assembly than the terminal cap is and that is electrically connected to the positive electrode plate or the negative electrode plate,
      a safety valve that is disposed between the terminal cap and the terminal plate, a peripheral portion of which is conductively connected to the terminal cap, in which a conductive contact portion provided in a part other than the peripheral portion is conductively connected by welding to the terminal plate, and that has such a structure that, when internal pressure increases, electrical conduction with the terminal plate is cut off,
      a protrusion formed on a side of the safety valve closer to the wound electrode assembly and on the outer peripheral side of the conductive contact portion so as to be inclined toward a center of the safety valve, and an insulating member that is disposed between a peripheral portion of the terminal plate and the safety valve, that covers at least the top of the protrusion, a side of the protrusion closer to the center of the safety valve, and a surface of the safety valve on the center side, that is fitted to a side of the protrusion closer to the center of the safety valve, and whose vertical sectional shape is bent in a Z-shape, wherein the terminal plate is fitted and fixed to a side of the insulating member closer to the center of the safety valve, and is connected by welding to the conductive contact portion through a central opening of the insulating member, and wherein the protrusion is a plurality of protrusions formed annularly and intermittently, and the insulating member is annular.

2. The cylindrical secondary battery according to claim 1, wherein a tapered portion is formed in the outer peripheral part of the terminal plate in the direction of fitting to the insulating member.

3. The cylindrical secondary battery according to claim 1, wherein the protrusion is formed by press working.

4. A method for manufacturing a cylindrical secondary battery, comprising the steps of:

winding a positive electrode plate and a negative electrode plate such that they are insulated from each other with a separator therebetween to form a wound electrode assembly;

using a safety valve that has, in a part other than a peripheral part, a conductive contact portion that is broken and separated from the peripheral part when internal pressure increases and that has a protrusion formed on the outer peripheral side of the conductive contact portion so as to be inclined toward a center of the safety valve, conductively disposing a terminal cap and a side of the safety valve opposite the side on which the protrusion is formed, and fitting an insulating member whose vertical sectional shape is bent in a Z-shape to a side of the protrusion closer to the center of the safety valve, thereby covering at least the top of the protrusion, a side of the protrusion closer to the center of the safety valve, and a surface of the safety valve on the center side, fitting a terminal plate electrically connected to the positive electrode plate or the negative electrode plate to a side of the insulating member closer to the center of the safety valve, and connecting by welding the terminal plate and the conductive contact portion of the safety valve through a central opening of the insulating member to form a sealing body;

disposing the wound electrode assembly in a bottomed tubular cylindrical outer can, and injecting an electrolyte into the cylindrical outer can; and disposing the sealing body in the opening of the cylindrical outer can with a gasket therebetween such that the terminal cap is on the outer side, caulking the opening of the cylindrical outer can, and thereby sealing and fixing the sealing body to the opening of the cylindrical outer can, wherein the protrusion is formed as a plurality of protrusions formed annularly and intermittently, and the insulating member used is annular.

5. The method for manufacturing a cylindrical secondary battery according to claim 4, wherein, in the insulating member used, the diameter on the outer peripheral side in the direction of fitting to the protrusion is larger than the inner diameter of the distal end of the protrusion.

6. The method for manufacturing a cylindrical secondary battery according to claim 4, wherein the terminal plate used is larger than the inner diameter of a corner portion of the protrusion of the insulating member.

7. The method for manufacturing a cylindrical secondary battery according to claim 4, wherein a corner portion of the protrusion closer to the center of the safety valve is rounded.

8. The method for manufacturing a cylindrical secondary battery according to claim 4, wherein, in the insulating member used, the Z-shaped bending angle is larger than the inclination angle of the protrusion with respect to the safety valve.

9. The method for manufacturing a cylindrical secondary battery according to claim 4, wherein, in the insulating member used, a corner portion of a part fitted to the protrusion is rounded.

10. The method for manufacturing a cylindrical secondary battery according to claim 4, wherein the terminal plate used has a tapered portion that is formed in a corner portion in the direction of fitting to the insulating member.

11. The cylindrical secondary battery according to claim 1, wherein a tapered portion is formed in the outer peripheral part of the terminal plate in the direction of fitting to the insulating member.

* * * * *